United States Patent
Akemann et al.

(10) Patent No.: US 11,547,930 B2
(45) Date of Patent: Jan. 10, 2023

(54) VOICE CONTROL FOR VIRTUAL REALITY PLATFORM

(71) Applicant: Skydance Media, Santa Monica, CA (US)

(72) Inventors: Peter T Akemann, Santa Monica, CA (US); Jason Keeney, Santa Monica, CA (US); Leon Hui, Santa Monica, CA (US); Yanqi Niu, Santa Monica, CA (US)

(73) Assignee: Skydance Media, Santa Monica, CA (US)

( * ) Notice: Subject to any disclaimer, the term of this patent is extended or adjusted under 35 U.S.C. 154(b) by 350 days.

(21) Appl. No.: 16/399,324

(22) Filed: Apr. 30, 2019

(65) Prior Publication Data
US 2020/0330856 A1    Oct. 22, 2020

Related U.S. Application Data

(60) Provisional application No. 62/836,430, filed on Apr. 19, 2019.

(51) Int. Cl.
*A63F 13/215* (2014.01)
*A63F 13/35* (2014.01)
*A63F 13/424* (2014.01)

(52) U.S. Cl.
CPC ............ *A63F 13/215* (2014.09); *A63F 13/35* (2014.09); *A63F 13/424* (2014.09)

(58) Field of Classification Search
CPC ...... A63F 13/35; A63F 13/215; A63F 13/424; G06F 3/165; G06F 3/167; G06F 16/33
(Continued)

(56) References Cited

U.S. PATENT DOCUMENTS 6,396,907 B1 * 5/2002 Didcock ............. H04M 3/5307
                                                      379/88.13
9,966,065 B2 * 5/2018 Gruber ................ G06F 40/205
(Continued)

FOREIGN PATENT DOCUMENTS

KR    10-2019-0027563 A    3/2019

OTHER PUBLICATIONS

International Search Report and Written Opinion from International Application No. PCT/US20/29011, dated Jul. 16, 2020.

*Primary Examiner* — Kang Hu
*Assistant Examiner* — Wei Lee
(74) *Attorney, Agent, or Firm* — Sterne, Kessler, Goldstein & Fox P.L.L.C.

(57) ABSTRACT

Disclosed herein are system, method, and computer program product embodiments for incorporating a voice command from a user into a game. An embodiment operates by receiving real-time context data of a game and a voice command from a user of the game. After receipt, the voice command is parsed and a particular module of a plurality of modules containing static context data of the game is identified based on the parsed voice command. Based on the parsed voice command and the static context data of the game, a preliminary outcome is determined. The preliminary outcome and real-time game context data is then provided to determine a preliminary action and a final action different from the preliminary action, wherein the final action is to be incorporated into the game.

20 Claims, 4 Drawing Sheets

(58) Field of Classification Search
USPC .......................................................... 463/36
See application file for complete search history.

(56) References Cited

U.S. PATENT DOCUMENTS

| | | | |
|---|---|---|---|
| 2005/0262042 A1* | 11/2005 | Kondo | G06F 40/129 |
| 2012/0290290 A1 | 11/2012 | Tur et al. | |
| 2013/0010975 A1 | 1/2013 | Tsingos et al. | |
| 2017/0186432 A1* | 6/2017 | Aleksic | G10L 15/1815 |
| 2019/0001219 A1* | 1/2019 | Sardari | G06N 5/025 |

* cited by examiner

VOICE CONTROL FOR VIRTUAL REALITY PLATFORM

CROSS REFERENCE TO RELATED APPLICATIONS

This application claims priority to U.S. Provisional Patent Application No. 62/836,430, filed on Apr. 19, 2019, which is incorporated herein by reference in its entirety.

BACKGROUND

Video games provide users with various manners to interact with a virtual environment and virtual characters in that environment. Historically, there have been attempts to have a user's voice be part of video games and permit interaction with the virtual environment and with virtual characters in that environment. However, voice recognition technology and the resulting processing has been unable to accurately interpret the user's voice and precisely provide the appropriate action in the video game based on the user's voice. Similarly, the required computational power for processing the user's voice has been prohibitively high, thus preventing the processing from being done in real time so that users may readily receive feedback.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, determining an appropriate action in a game from a voice of a user of the game.

An example video game in which embodiments of the present invention may be used is a first-person perspective video game having a virtual character that interacts with virtual objects and entities in virtual environments. In the past, a first-person video game may have required a user to manipulate manual controls to select certain objects in the environment or interact with other entities in the environment (which may be virtual players or other players controlled by different users). However, the user may not be able to use voice commands to realize these controls. With the development of technology, cloud-based voice recognition has seen enormous growth. Conversational agents have been developed to better understand and converse with a human.

In embodiments of the present invention, the user may speak vocal commands that are interpreted by the video game and which result in an action in the video game that maps to the vocal commands. To parse the vocal commands, a voice server running in parallel and separate from a gaming server may parse the voice command, since the parsing of voice commands is typically computationally intensive. Moreover, since parsing may take time and the game state may thus change in the interim, the game server may know a current game state when the voice command was provided to properly interpret the voice command, e.g., once it has been parsed by the voice server. As such, the vocal command may be combined with historical and/or current context data about the virtual environment to determine the appropriate action intended by the user. The historical context data may be maintained such that the voice command is matched with the context data that existed at the time the vocal command was made. For example, if the user's virtual character points or looks at a certain direction while the user provides a voice command and then performs additional interactions with the video game, the video game may utilize the historical context data (e.g., the direction the user's virtual character was pointing or looking) and/or the current real-time game context data (e.g., where the user's virtual character is currently located) to provide the resulting action (even if only a few milliseconds of time has passed).

Along these lines, to properly identify the user's voice commands, the video game may forward their voice command via a transport mechanism(s) to a voice server employing third-party voice recognition software. The voice recognition software may analyze the voice commands based on the context data of the video game when the voice commands were issued.

Figure 1:
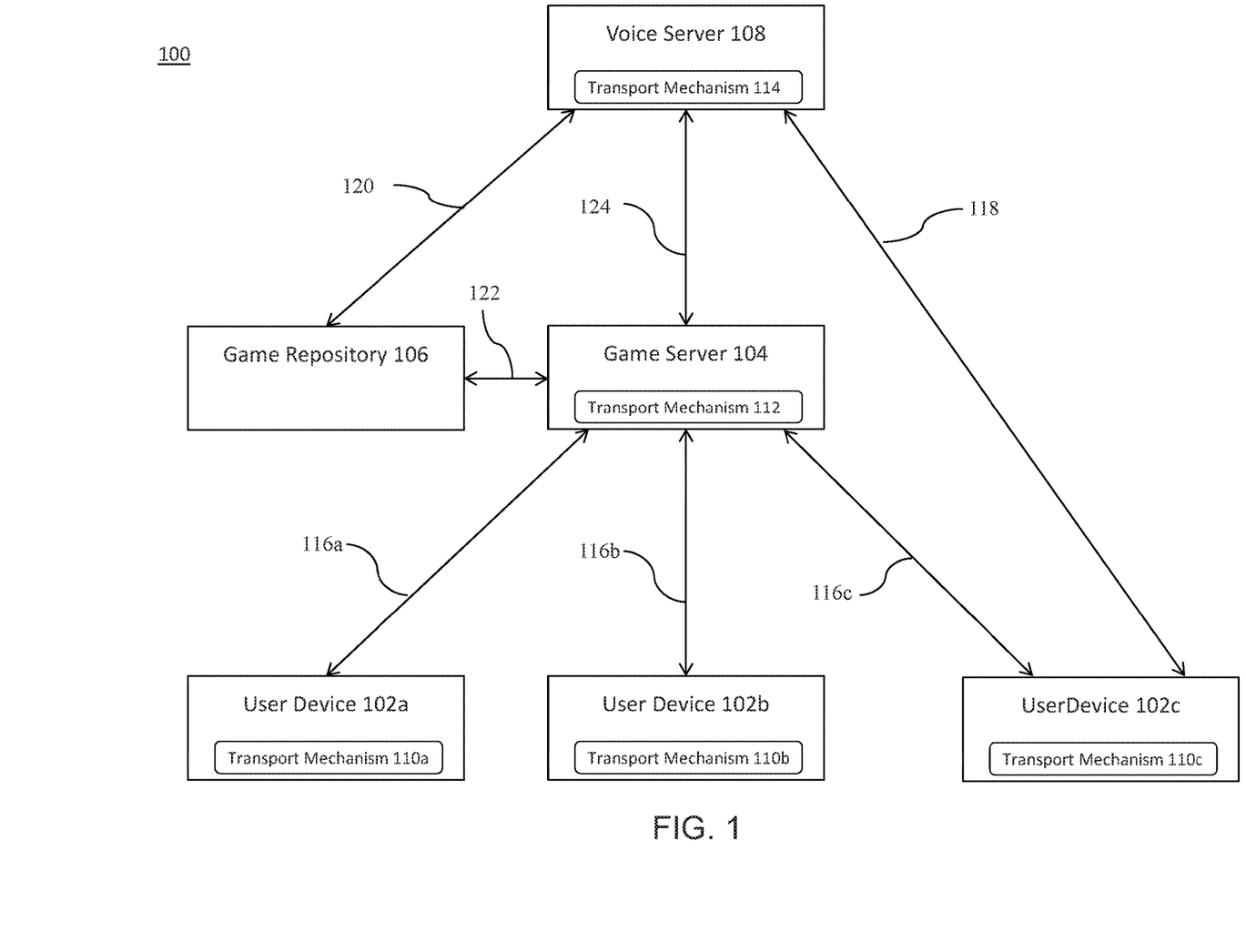
FIG. 1 is a block diagram of a system for interacting with various aspects of a virtual environment in a video game based on voice data of a user of the video game, according to some embodiments.

FIG. 1 illustrates a block diagram of a system 100 for interacting with various aspects of a virtual environment in a video game based on a voice data of a user of the video game. The system 100 may include a plurality of user devices 102, a game server 104, a game repository 106, and/or a voice server 108. In some embodiments, although not illustrated, the game server 104 and user device 104A may be the same device (e.g., in a single-player non-networked game experience). Moreover, the devices and/or components may be physical or virtual and may be managed and/or provided by different or the same entities. For example, the user devices 102 may be managed by users (e.g., players), the game server 104 and the game repository 106 may be managed and/or provided by a specific entity (e.g., an organization or company), and the voice server 108 may be managed and/or by a third party entity (e.g., Amazon, Google, IBM, Apple). Along these lines, the game server 104, the game repository 106, and the game server 108 may be deployed and/or provided on a cloud computing environment. Accordingly, in some embodiments, the game server 104, the game repository 106, and/or the voice server 108 may be accessed via a cloud computing environment and thus may provide access from anywhere and at any time that the cloud communications network 118 is enabled.

The user devices 102 may be in communication with the game server 104 over a communication line or mediums 116 and by transport mechanisms 110 and 112. The user devices 102 may be in communication with the voice server 114 over a communication line or mediums 118 and by a transport mechanisms 110 and 118, although only a single user device is illustrated as such. Moreover, the game repository 106 may be in communication with the game server 104 and the voice server 108 over a communication line or medium 120 and a communication line or medium 122, respectively. Further, the game server may be in communication with the voice server over a communication line or medium 124.

User devices 102 may be any type of device capable of providing a virtual environment of the game to the user. As such, the user device 102 may be indirectly or directly providing the game experience to the user. For example, the user devices 102 may stream games as provided by the game server 104. The user devices 102 may also store games or may receive physical mediums (e.g., compact discs, memory chips, etc.) of games. As such, the user devices 102 may be a standalone and/or handheld computing device. The user devices 102 may be a game console, a computer, a desktop, a laptop, a cellular phone, a palm-top, a personal digital assistant, or a mobile device, just to name just a few examples. In some embodiments, the client devices 102 may also comprise be a virtual device on a game streaming service (e.g., GOOGLE STADIA produced by Google, Inc. of Mountain View, Calif., PLAYSTATION NOW produced by Sony Interactive Entertainment LLC of San Mateo, Calif., and MICROSOFT XCLOUD produced by Microsoft, Inc. of Redmond, Wash.) connected to a local steaming client (e.g., GOOGLE CHROME—produced by Google, Inc. of Mountain View, Calif.—running on any supported device).

The user devices 102 may receive and/or provide game context data to the user and may receive voice data from the user. The game context data may include any aspect of the virtual environment of the video game. Accordingly, game context data may include static game context data and/or real-time game context data. Static game context data may be any data that remains the same (e.g., does not change) throughout the video game and thus may include any aspect of the virtual environment. For example, static game context data may include the video game's design and layout, objects and locations in the video game as well as their names. Thus, static game context data may be provided and/or configured before the video game even starts and updated while the user plays the video game.

Real-time game context data may be any data that changes and/or updates as the user progresses through the video game (e.g., at particular points of time). For example, real-time game context data may include a number and type of objects in a particular area (e.g., a current view of the user), a mode of the video game (e.g., combative or non-combative), a current level of the video game (e.g., first, second, or third), and/or state and event information from input devices (e.g., a keyboard, mouse, a head-mounted display, a camera, and a game controller) and from other virtual players also present in the virtual environment.

Accordingly, at any point of time in the video game, the game server 104 may provide and/or receive static game context data along with real-time game context data. Thus, real-time game context data and static game context data may include objects in the video game. Objects may be any object in the video game that the user may see and/or interact with (e.g., virtual characters, platforms, walls, weapons, etc.). Moreover, real-time game context data may include user-related actions and/or game-related actions. User-related actions may relate to an action resulting from the user's input, e.g., manually or via voice commands. Moreover, game-related actions may be unrelated to an action to be performed by a virtual character in the video game. As such, the game-related actions may be provided by the user devices 102 and/or game server 104 as the user progresses through the virtual environment.

As such, when considered along with voice data, real-time game context data may include where the user is located, looking, and/or pointing at the moment the user is providing the voice data. For example, if the user does not address the name of the virtual character—"Alpha"—when requesting that they "come over here," the real-time game context data may include the location of the user's virtual character, the location of Alpha, and the direction that the user is looking so that the voice server 108 may determine to whom the user is referring, and where "here" is.

Moreover, the voice command may be any type of command provided by the users to express their intent in the virtual environment (e.g., telling a virtual character to move to a desired location in the virtual environment). The command may include one or more words. As such, the voice command may be a phrase and/or a sentence.

Along these lines, the command may be automatically detected by the voice server 108. The command may also be initialized by some user interface. For example, the user may press a button on a remote control (e.g., a push-to-talk button) and provide the command. Alternatively, the command may be initialized by a trigger word (e.g., "Alexa") and terminated by a period of silence (e.g., 3 seconds). As will be described in more detail below, the voice server 108 may utilize a third-party conversational agent or conversational agent such as ALEXA produced by Amazon.com, Inc. of Seattle, Wash., GOOGLE NOW produced by Google, Inc. of Mountain View, Calif., CORTANA produced by Microsoft, Inc. of Redmond, Wash., or SIRI produced by Apple, Inc. of Cupertino, Calif., among others. Thus, the voice data may include a trigger word (e.g., "Alexa" or "Hey Siri") prior to the command.

To permit identification of the objects, each object (e.g., desks, guns, and virtual characters) in the virtual environment may be tagged with a name, provided synonyms for the name, and/or provided rules for interacting therewith. As such, although objects in the video game may be referenced by voice data to perform designated actions, the video game may also identify them by their location in the virtual environment, which can allow multiple objects with the same name to be identified (e.g. this door or that door). Moreover, some of the objects in the video game may be referenced by voice data to perform actions in different ways and/or purposes. For example, where "Alpha" and "Charlie" are two different objects in the video game (e.g., virtual characters), the user may be able to say—"Alpha, follow Charlie" and "Alpha, jump." Thus, the user may be able to instruct "Alpha" to perform these different actions, i.e., following Charlie or jumping. Similarly, the user could instruct "Charlie" to perform the same action relative to Alpha, e.g., "Charlie follow Alpha." As such, an object can occupy more than one role (e.g., a subject or an object).

Also, non-objects in the video game may have nodes defined by an area in the virtual environment, tagged with a name, provided synonyms for the name, and/or provided rules for interacting therewith. As such, non-objects may be a location in the video game, such as a base position, an entrance, and a room, just to name a few examples. For example, in the voice command "return to base," the base may not be an object and rather may be a location in the video game and thus be associated with a node.

User devices 102 may send the game context data to the game server 104 and the voice server 108. As such, when the user does not provide voice commands, the user devices 102 may send game context data to the game server 104. And, when the user does provide voice commands, the user device 102 may also send associated game context data, an identification code of the requesting user device 102, and/or an identification code of corresponding game server 104 to the voice server 108 along with the voice commands. In doing so, prior to sending to the voice server 108, the user device 102 may timestamp or timecode the associated game context data and/or the voice data to assist the voice server 108 in determining the resulting action corresponding to the voice commands. Thus, when there are voice commands, at the same point of time, the user device 102 may send game context data to the game server 104 and the voice server. The associated game context data may assist the voice server 108 in processing the voice command into an action in the virtual environment, as will be described in more detail below.

User devices 102 may send voice commands, associated game context data, an identification code of the requesting user device 102, and/or an identification code of corresponding game server 104 to the voice server as a file and/or a stream of data. To do so, the user devices 102 may have transport mechanisms 110 to identify and route the data to the voice server 108. The user devices 102's transport mechanisms 110 may comprise a pipeline specifically designed for audio and video transport (e.g., not media transport such as the game context data). As such, the transport mechanisms 110 may deploy dedicated media transport protocols for sending the voice commands. The transport mechanism 110 may be, for example, a third-party program. Example third-party programs may include GStreamer (an open-source multimedia pipeline). Although illustrated as being integrated within the user devices 102, the transport mechanisms 110 may also be standalone devices.

Moreover, the transport mechanisms 110 may contain various transporting layers for handling communication between the user devices 102 and the voice server 108 or between the user devices 102 and the game sever 104. For example, the transporting mechanisms 110 may have a first dedicated transport layer for sending voice commands and associated game context data from the user devices 102 to the voice server 108, a second dedicated transporting layer for receiving a resulting outcome from voice commands, and a third transporting layer dedicated for relaying the outcome to the game server 104 for its own use and/or for further relay to the other user devices 102. Along these lines, the transporting mechanisms 110 may have separate transporting layers based on the type of resulting outcome from the voice server 108. For example, if the resulting outcome is an action to be performed in the video game (e.g., shoot, jump, move, duck, etc.), the transporting mechanisms 110 may provide a specific transport layer. And, if the outcome is a voice response from the voice server 108 (e.g., a piece of music, an answer to a user's question), the transporting mechanisms 110 may provide a different transport layer.

Game server 104 may store, provide and/or receive real-time game context data to/from the user devices 102 and/or game repository 106. The game server 104 may timestamp or timecode the game context data received from the user devices. As will be discussed below, upon processing of the voice data by the voice server 108, the game server 104 may provide the user devices 102 with a response in the game based on voice commands. For example, as will be explained below, the voice server 108 may process the voice data and store the processed results in the game repository 106. In turn, the game server 104 may receive the processed results from the game repository 106 and then provide the user devices 102 with an appropriate response based on the processing. Along these lines, without performing any processing, the game server 104 may also forward voice data from particular user devices 102 to other user devices 102. As such, the game server 104 may never be processing voice data to determine appropriate responses.

Game repository 106 may be available for two-way communication between the game server 104 and the voice server 108. As such, the game repository 106 may store game context data (e.g., real-time game context data and static game context data) and possible actions for game context data (e.g., non-voice data) received by the game server 104.

As will described below, the game repository 106 may receive preliminary outcomes from the voice server 108 based on voice data and real-time game context data received from the user devices 108. Accordingly, the game repository 106 may also store possible preliminary outcomes that may be received from the voice server 108 and preliminary actions corresponding to the preliminary outcomes. Accordingly, the game repository 106 may store different preliminary actions based on specific preliminary outcomes. As such, based on a specific preliminary outcome, the game repository 106 may determine an appropriate preliminary action. For non-voice data, the preliminary action may be the final action to be incorporated into the video game. However, for voice data, the preliminary action may require additional processing in order to be a final action and be incorporated into the video game. As such, for voice data, the game server 104 may utilize the preliminary actions received from the game repository 106 as templates to implement the appropriate final actions in the video game, as will described in more detail below.

Accordingly, for actions relating to game context data (e.g., non-voice data), the game server 104 may determine the appropriate final actions (e.g., the preliminary actions) to be performed in the video game based on the game context data and input received from the user devices 102. For example, the game server 104 may receive real-time game context data from the user devices 102 relating to the user's virtual character striking a virtual enemy character. The game server 104 may determine an appropriate action from the strike (e.g., hurting or defeating the enemy).

Likewise, for actions relating to voice commands, the game server 104 may operate in a similar fashion. The game server 104 may retrieve the appropriate preliminary action from the game repository 106 based on the preliminary outcome provided by the voice server 108. As mentioned above, the preliminary action may serve as a template to implement the final action in the video game. The game server 104 may then refine the preliminary action into a final action based on real-time game context data.

For example, if the voice command was "guard that door," the game server 104 may access the game repository 106, and then retrieve that preliminary action corresponding thereto—e.g., to protect the door corresponding thereto. The game server 104 may then utilize the preliminary action as a template for determining the final action. For instance, the game server 104 may determine the particular door based on the real-time game context data (e.g., a relative position of the user to the particular door, a location of doors within a predefined distance in the virtual environment form the user, a volume of the voice command, etc.). The game server 104 may identify this particular door as being the final action to be incorporated into the game. As such, the game server 104 may then send the final action to the user devices 102.

Voice server 108 may be a dialogue system or conversational agent that is capable of processing natural language. As stated above, the voice server 108 may receive voice commands from the user devices 102 as a voice file or a stream of data. The voice server 108 may then utilize, for example, third-party voice recognition software or conversational agents, such as those listed above, to analyze the voice commands.

Voice server 108 may contain various master voice recognition modules corresponding to different games. The master voice recognition modules may have static context data from the particular games and the actions that the video game supports corresponding thereto. As such, a master voice recognition module for a particular game may have multiple sub-modules corresponding to different subsets of the static game context data relevant for different types/ groups of voice commands relevant to different game context data. For example, a particular sub-module may handle navigational commands for other virtual characters in the game for when the voice command is issued in a navigation game context, and another sub-module may handle negotiation commands with other virtual characters in the game when such commands are issued in a negotiation game context. As such, these sub-modules may be pre-configured with subsets of the static game context data to assist in resolving voice commands relevant to the corresponding game context data.

Accordingly, in analyzing the voice commands, the user device 102 may contact the appropriate master voice recognition module corresponding to the specific game the user is playing. Furthermore, the user device 102 may specify the appropriate submodule of the master module corresponding to the game context data (e.g., the activity engaged in, stage/level of the game, status of the game) in which the voice command is issued. The voice server 108 may then route the voice command to the sub-module specified by the originating client device 102 on which the voice command was issued. Based on the parsing of the real-time game context data, the voice server 108 may identify one or more portions of the data. As stated above, the voice data may contain words (e.g., a phrase or a sentence). As such, to identify the appropriate/relevant real-time game context data, the voice server 108 may identify the words in the phrase/sentence and whether they are singular or plural (e.g., modified by a numerical adjective). For example, if the user says "Alpha, stop running," the voice server 108 may identify the subject of the phrase and determine that it needs to identify a single virtual character in the virtual environment. And if the user says "give me three gold coins," the voice server 108 may identify the item type requested (e.g., gold coins) and the number requested (e.g., 3). Likewise, if the user says "hey guys, come here," the voice server 108 may identify that the user is referring to multiple virtual characters. As explained above, after the voice server 108 provides the preliminary outcome to the game repository 106, the game server 104 may then identify the corresponding preliminary action and determine the specific virtual characters that the user is referring to.

The voice server 108 may then forward the preliminary outcome of the voice command and timestamps/timecodes provided by the originating user device 102 to the game repository 106. Thereafter, the game server 104 may query the game repository 106 for an available preliminary action. After locating the available preliminary action, the game server 104 may receive the preliminary action from the game repository 106 and the timestamps/timecodes of the corresponding preliminary outcome. The game server 104 may then compare the timestamps/timecodes of the preliminary outcome with the timestamps/timecodes of corresponding game context data received from the user device 102.

As such, the game server 104 may utilize the real-time game context provided by the user devices 102 to determine a final action. Accordingly, the final action may be unique to the user and be based on their specific intent. For example, as previously explained, if the user says "hey you, come here," the game server 104 may utilize real-time game context data provided by the user devices 102 to determine a time that the user is speaking and a virtual object that the user was speaking to. To determine the virtual object, the game server 104 may create a search region (e.g., a cone or any other shape) in a direction that the user is facing to identify possible objects for responding to the command. The game server 104 may then determine a likelihood of the command being intended for the object based on the nature of the real-time game context data. For example, the user in this example may be more likely to have referred to another virtual character than a knife or a gun. However, if there are several objects within the cone that also fit the context of the command, the game server 104 may select the closest object that can accept voice commands.

Along these lines, the game server 104 may utilize a particular volume of the voice data to determine the final action and/or specific intention of the user. To do so, the game client 102 may determine a normal volume of the user. Thereafter, the game client 102 may compare captured voice commands to the normal volume of the user. The comparison may be included in the real-time data passed with the voice command. In this manner, the user devices 102 need not to send any voice data to the game server 104. For example, if there is a first virtual character in closer proximity to the user than a second virtual character, the game server 104 may determine the user is speaking to the first virtual character when the volume of the voice data is lower than normal and to the second virtual character when the volume is louder than normal.

After determining the final action to be taken, the game server 104 may then execute the final action in the virtual environment by sending instructions to the user devices 102 and/or voice server 108. Accordingly, the implementation of the final action may require instructions to be sent to the user devices 102 and/or the voice server 108. For example, where the user vocally requests a gun (e.g., a voice command), the game server 108 may send instructions to the user devices 102 for showing the knife in the virtual environment, as well as instructions to the voice server 108 for sending audio data of "here is your gun" to the user devices 102. As discussed above, the voice server 108 may then send the audio data to the user devices via the transporting mechanism 114. The game server 104 and the voice server 108 may therefore send instructions and/or audio data relating to the same final action to the user devices 102 at essentially the same time (e.g., because both commands were issued by the game server 104 at essentially the same time). The user devices may then present the audio data (e.g. a voice saying "here is your gun") at the same time it executes the instructions relating to the action (e.g. making the gun appear), so to the user they appear to be part of the same event which occurred in response to their voice command.

In some embodiments, the voice server 108 may send its preliminary outcome directly to the user devices 102, e.g., via an asynchronous callback. As such, the user devices 102 will determine a final action based on the preliminary outcome and then send the final action to the game server 104 to determine if it should be executed in the game. For example, the user may say "Hey You come here" to a virtual character standing in front of the user's virtual character. The user's user device 102A will capture the voice command and send it to the voice server 108. The voice server 108 will resolve the voice command into a preliminary outcome. In doing so, the voice server 108 may parse the voice command and identify the word "come" as relating to a particular object in the game and the word "here" as relating to a particular location in the game. The voice server 108 may then send requests to the user device 102 to determine the particular object and location in the game. Upon receipt, the user service may then determine the final action based on the voice command and real-time game context data when the voice command was issued. The user device 102A may send the final action to the game server 104 to determine if it should be incorporated into the video game. If the game server 104 decides to issue it into the game, the game server 104 may send a command to the virtual character to perform the final action (e.g., a "go to location" command to navigate the virtual character to the specified location).

Figure 2:
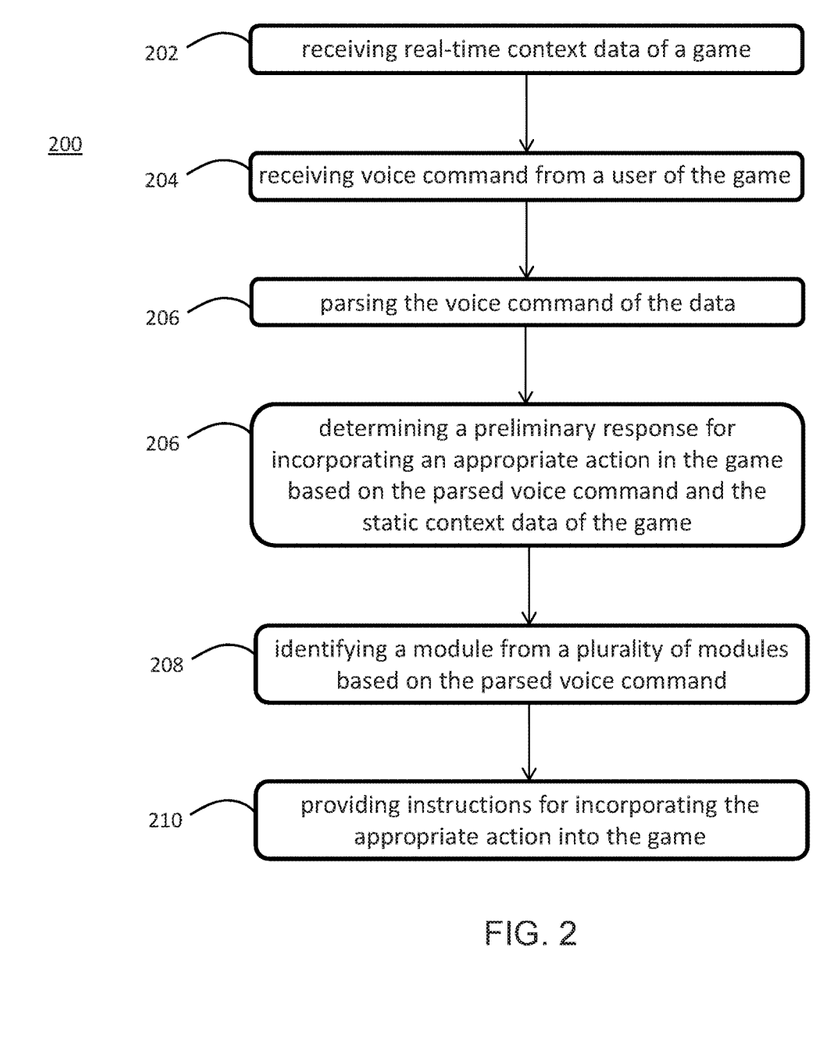
FIGS. 2 and 3 are flowcharts illustrating processes for interacting with various aspects of a virtual environment in a video game based on voice data of a user of the video game, according to some embodiments.
Figure 3:
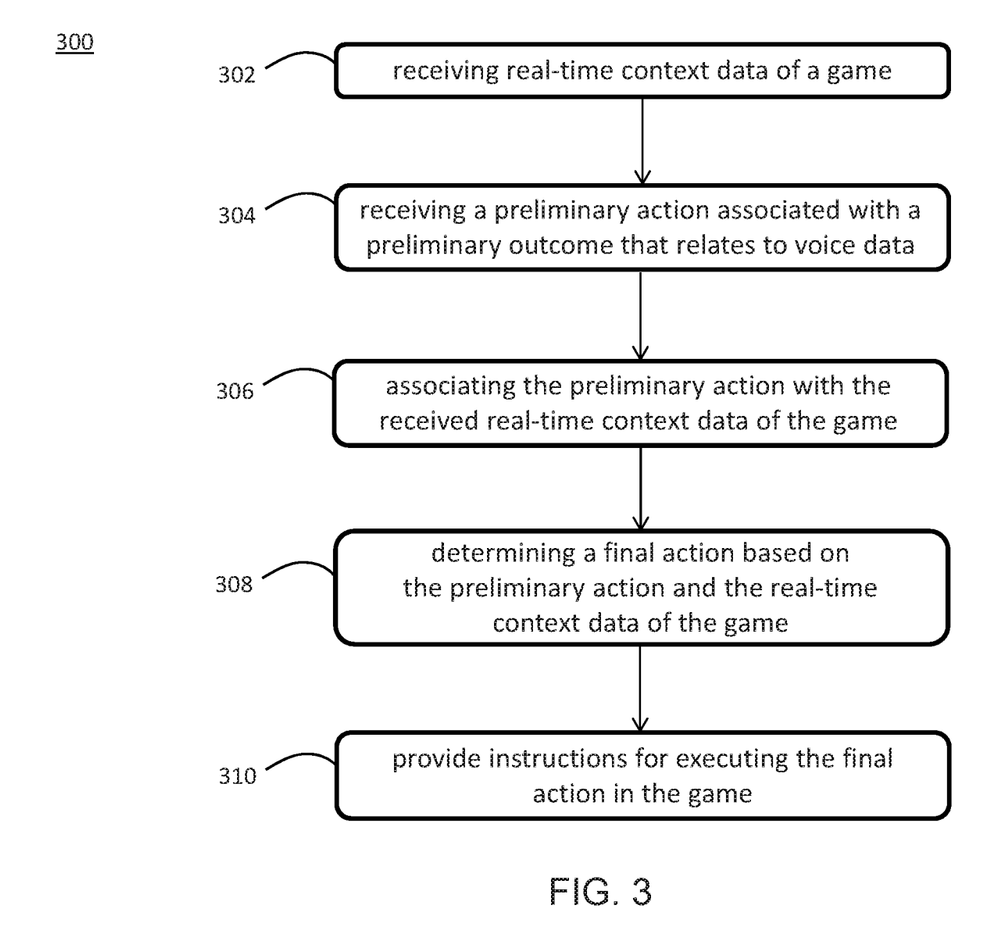

FIGS. 2 and 3 are flowcharts for methods 200 and 300 for incorporating a voice command of a user into a video game, according to various embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 2 and 3, as will be understood by a person of ordinary skill in the art.

Referring now to FIG. 2, method 200 shall be described with reference to FIG. 1. However, method 200 is not limited to that example embodiment.

In 202, the voice server 108 may receive real-time context data of a game.

In 204, the voice server 108 may receive a voice command of a user of the video game, wherein the voice command relates to the real-time game context data. For example, the voice command may relate to an object in the game (e.g., another virtual character). The voice command of the user and the real-time context data of the game may be provided by the user devices 102.

In 206, the voice server 108 may identify a module from a plurality of modules based on the parsed voice command, wherein the plurality of modules contain static context data of the game different from the real-time context of the video game. The plurality of modules may include a master module and a plurality of sub-modules of the master modules, and each of the sub-modules may have different static context data and assist in determining preliminary responses provided by the voice server 108 and/or appropriate actions in the video game. As such, the identified module may be a particular sub-module.

In 208, the voice server 108 may parse the voice command of the user. In doing so, the voice server 108 may identify one or more portions of the received voice data. The voice command may be a phrase of words provided by the user. Accordingly, the phrase of words may include verbs, adjectives, subjects and/or nouns. In turn, the identified portions may be a particular word of the phrase, such as subjects.

In 210, the voice server 108 may determine a preliminary outcome based on the parsed voice command and the real-time context data of the video game. Each possible of the preliminary responses for the plurality of sub-modules may be different.

In 212, the voice server 108 may provide the preliminary outcome and optionally the real-time game context data to determine a preliminary action and a final action different from the preliminary action, wherein the final action is to be incorporated into the game. The game server 108 may store the preliminary response in the game repository 106, which then may be accessed by the game server 104. The game server 104 may thereafter the determine action based on real-time game context data.

Referring now to FIG. 3, method 300 shall be described with reference to FIG. 1. However, method 300 is not limited to that example embodiment.

In 302, the game server 104 may receive real-time context data of a game.

In 304, the game server 104 may receive a preliminary action associated with a preliminary outcome that relates to a voice command provided by the user of the game. The preliminary outcome may be derived by a voice server 108 receiving the voice data and stored in a game repository 106. In doing so, the game repository 106 may also store time-code/time stamps associated with the voice data and associate such with the preliminary action.

In 306, the game server 104 may determine a preliminary action based on the preliminary outcome. The game repository may store various preliminary actions for different preliminary outcomes provided by the voice server 108.

In 308, the game server 104 may determine a final action different from the final action based on the preliminary action and the real-time context data of the game.

In 310, the game server 104 may provide instructions for executing the final action into the game. The instructions may be sent to user device 102 or the voice server 108. The voice may then send additional instructions or content to the user device 102.

Figure 4:
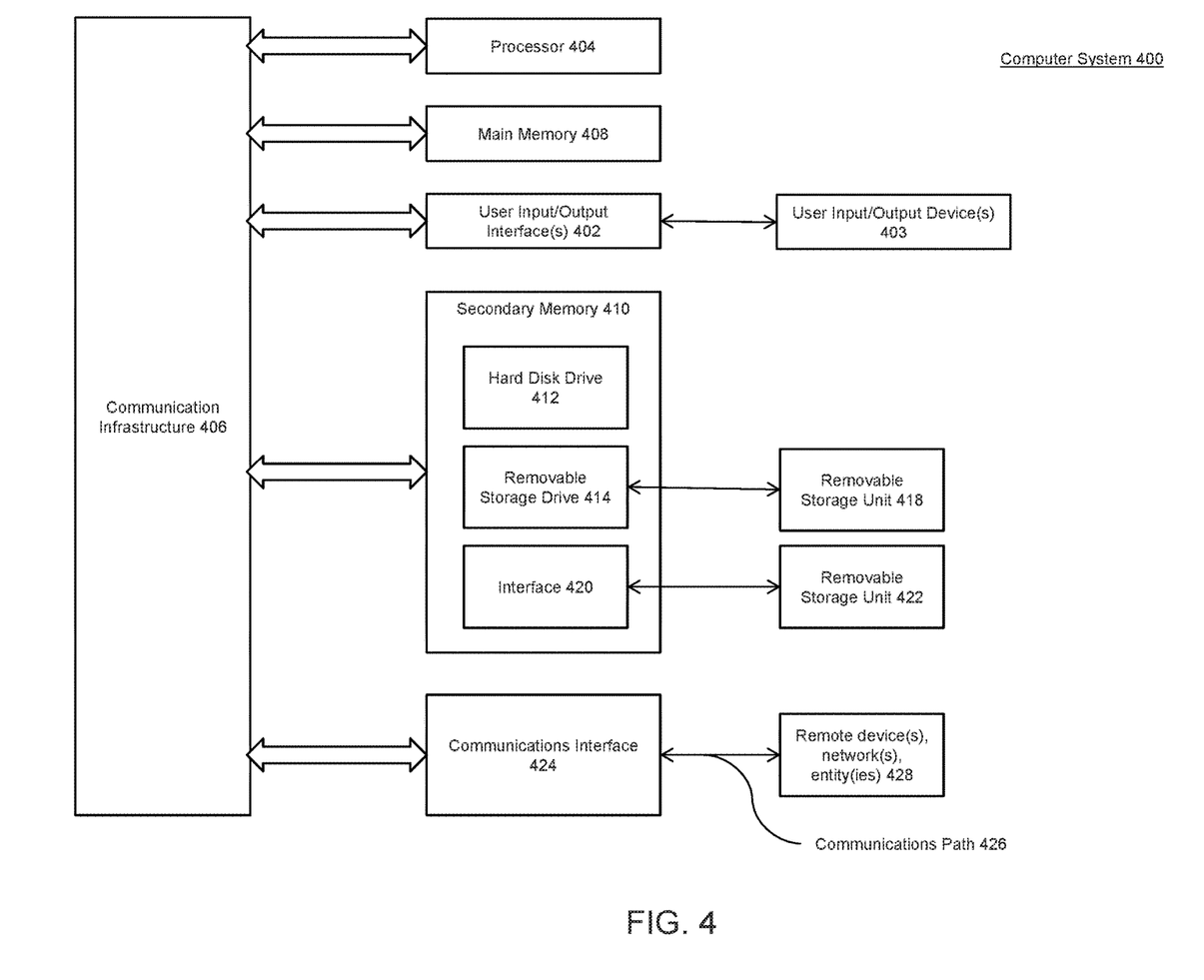
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:
1. A computer-implemented method for incorporating a voice command from a user into a game, comprising:
  receiving, by at least one processor, real-time context data of an object within the game;

receiving, by the at least one processor, the voice command from a virtual character representing the user in the game, wherein the voice command relates to the real-time context data of the object within the game;

parsing, by the at least one processor via a conversational agent, the voice command;

identifying, by the at least one processor, a reference in the voice command based on the real-time context data, wherein the reference corresponds to a non-object associated with a node of the game;

determining, by the at least one processor using a search region within the game, one or more possible objects associated with the node of the game, wherein the one or more possible objects are in a direction of the virtual character's voice command;

identifying, by the at least one processor based on the real-time context data and the voice command, the object out of the one or more possible objects in the search regions for responding to the voice command;

identifying, by the at least one processor, a module corresponding to the object, based on the parsing of the voice command and the real-time context data, wherein the one or more possible objects correspond to respective modules of a plurality of modules, wherein the plurality of modules are configured with static context data of the game, and wherein the static context data of the game is different from the real-time context of the game;

determining, by the at least one processor, a preliminary outcome based on the parsed voice command, the reference, and the static context data of the game in the module;

providing, by the least one processor, the preliminary outcome to determine a preliminary action and a final action different from the preliminary action,
wherein the final action is to be incorporated into the game for the object to respond to the voice command, and
wherein at least one of the receiving, the parsing, the identifying, the determining, or the providing, is performed by one or more computers.

2. The computer-implemented method of claim 1, wherein the voice command of the user comprises one or more words provided by the user.

3. The computer-implemented method of claim 2, further comprising:
identifying, by the at least one processor, a particular word from the one or more words provided by the user.

4. The computer-implemented method of claim 3, wherein the particular word is a subject of a phrase comprising the one or more words provided by the user.

5. The computer-implemented method of claim 1, wherein the plurality of modules comprise different static-context data of the game, wherein the different static-context data further comprise a layout of the game and object relationships in the game, and wherein the real-time context data comprises a location of the object, a relative characteristic between the object and the one or more possible objects, and game-related actions of the object.

6. The computer-implemented method of claim 5, wherein the plurality of modules includes a master module and a plurality of sub-modules of the master module.

7. The computer-implemented method of claim 6, wherein the master module is configured to identify the game.

8. The computer-implemented method of claim 6, wherein each of the plurality of sub-modules is configured to provide different types of voice commands.

9. The computer-implemented method of claim 1, wherein the voice command is received from a transport mechanism configured to receive the voice command from the game server.

10. The computer-implemented method of claim 9, wherein the voice command is parsed by a voice server that has a greater processing power than a game server in communication with a user device configured to receive user input comprising the voice command.

11. The computer-implemented method of claim 10, wherein the game server is configured to determine the final action based on real-time context data of the game and the preliminary action.

12. The computer-implemented method of claim 1, wherein the voice command provided by the user relates to a virtual character in the game world to perform the final action.

13. A computer-implemented method for incorporating a voice command from a user into a game, comprising:
receiving, by at least one processor, real-time context data of an object within the game;
receiving, by the at least one processor, from a conversational agent, a preliminary outcome based on the voice command;
referencing, by the at least one processor, a location or a relative characteristic in the voice command corresponding to a non-object associated with a node of the game;
determining, by the at least one processor, one or more possible objects associated with the node of the game using a search region based on a direction of the voice command, wherein the one or more possible objects include the object;
determining, by the at least one processor, a preliminary action based on the preliminary outcome, the location or the relative characteristic corresponding to the non-object, the one or more possible objects, and the real-time context data;
determining, by the at least one processor, a final action different from the preliminary action, based on the preliminary action and the real-time context data of the object within the game; and
providing, by the at least one processor, instructions for executing the final action into the game for the object to respond to the voice command,
wherein the instructions include static context data of the game, the real-time context data of the object within the game, and additional context data of at least one further object within the game, and
wherein at least one of the receiving, the determining the preliminary action, the determining the final action, or the providing, is performed by one or more computers.

14. The computer-implemented method of claim 13, wherein the preliminary action serves as a template for the final action.

15. The computer-implemented method of claim 13, wherein the final action is determined from among a plurality of preliminary actions.

16. The computer-implemented method of claim 15, wherein the preliminary outcome is stored by a game repository.

17. The computer-implemented method of claim 16, wherein at least one of receiving, determining, and providing is performed by a game server different from the game repository.

18. The computer-implemented method of claim 17, wherein the voice command is received by a voice server, wherein the voice server is different from the game server and the game repository.

19. The computer-implemented method of claim 18, wherein the preliminary outcome is received by the voice server.

20. The computer-implemented method of claim 19, wherein the voice server has a greater processing power than the game server.

\* \* \* \* \*